United States Patent [19]

Johnston et al.

[11] Patent Number: 4,699,258

[45] Date of Patent: * Oct. 13, 1987

[54] VISCOUS CLUTCH FOR ENGINE COOLING FAN WITH OPTIMIZED LOW SPEED DISENGAGEMENT

[75] Inventors: Gary L. Johnston, Pleasant Hill; Harvey J. Lambert, West Milton, both of Ohio

[73] Assignee: General Motors Corporation, Detroit, Mich.

[*] Notice: The portion of the term of this patent subsequent to Dec. 23, 2003 has been disclaimed.

[21] Appl. No.: 671,502

[22] Filed: Nov. 15, 1984

[51] Int. Cl.⁴ ..................... F16D 35/00; F16D 43/25
[52] U.S. Cl. .................. 192/58 B; 192/82 T
[58] Field of Search ............. 192/57, 58 A, 58 B, 192/82 T

[56] References Cited

U.S. PATENT DOCUMENTS

| | | | |
|---|---|---|---|
| 3,227,254 | 1/1966 | Sutaruk | 192/58 B |
| 3,268,041 | 8/1966 | Roper | 192/58 B |
| 3,628,641 | 12/1971 | Snodgrass | 192/82 T |
| 3,858,697 | 1/1975 | Brewer et al. | 192/58 B |
| 3,949,849 | 4/1976 | Hammer | 192/82 T |
| 4,278,158 | 7/1981 | Martin | 192/82 T |
| 4,381,051 | 4/1983 | Kikuchi | 192/58 B |
| 4,403,684 | 9/1983 | Haeck | 192/58 B |
| 4,467,901 | 8/1984 | Hattori et al. | 192/58 B |

FOREIGN PATENT DOCUMENTS 167533  10/1982  Japan ................. 192/58 B

Primary Examiner—Rodney H. Bonck
Assistant Examiner—David A. Testardi
Attorney, Agent, or Firm—Charles R. White

[57] ABSTRACT

A viscous fan clutch employing flat wipers with angled edges secured on the inner annular periphery of the clutch body which scavage viscous fluid from the space between the inner diameter of the main body and the outer diameter of the clutch plate which controls the rate of discharge of pumping slots formed on the inside diameter of the body to optimize fluid flow from the working cavity to the storage cavity by way of a discrete intermediate cavity to reduce horsepower requirement when a low output speed during disengaged mode is desired or a faster rate of disengagement is required.

3 Claims, 4 Drawing Figures

VISCOUS CLUTCH FOR ENGINE COOLING FAN WITH OPTIMIZED LOW SPEED DISENGAGEMENT

This invention relates to fan clutches and more particularly to an automatic viscous clutch for an engine cooling fan featuring new and improved pump out wiper and slot construction for optimized discharge where a low output speed during the disengaged mode is desired or a faster rate of disengagement is required.

An automatic viscous fan clutch is a hydraulic device used to vary fan speed in response to engine temperature variation. This device permits the use of a high delivery fan to insure adequate cooling at reduced engine speeds while eliminating excessive noise and power loss at high speeds when cooling capacity is not needed. When the engine is cool, the viscous clutching fluid is stored in a reservoir chamber of the fan clutch and is blocked from entry into the working area of the clutch. As the temperature of the engine rises, so does the temperature of a bimetallic coil which is connected to a control arm that moves a valve plate progressively exposing an opening in the pump plate. The silicone fluid flows through this opening from the reservoir into the working area in the clutch. Raised pumping devices located on the pump plate force the fluid back into the reservoir through small openings in front of each of the pumping devices. As the temperature continues to rise, the control arm uncovers more of the opening and allows more of the silicone fluid to enter the working chamber. The automatic fan clutch becomes fully engaged when the silicone fluid circulating between the working chamber and the reservoir reaches a sufficient level in the working chamber to completely fill the fluid shear zone formed between the clutch body and the clutch plate. The resistance of the silicone fluid to the shearing action caused by the speed differential between the body and clutch plate transmits torque to the clutch body to thereby turn the fan blade assembly attached thereto. The reverse situation occurs when the temperature drops. On such occurrence, the bimetallic controlled valve plate slowly closes off the opening thus blocking the fluid flow from the reservoir into the working chamber. The action of the pumping devices removes the silicone fluid from the shear zone or the working chamber and reduces the shearing action. Thus less torque is transmitted to the clutch body and the speed of the fan decreases.

This invention applies to a viscous fan clutch such as described above and provides improved pump-out performance of the clutch to reduce and optimize disengagement time and to reduce the temperature differential between the engagement and disengagement temperature. The preferred embodiment of this invention employs pump slots or grooves on the inside diameter of the body at the outside diameter of the clutch plate. This invention further utilizes flat parallelogram-shaped wipers secured in pump pockets in the annular wall of the main body of the clutch and in sliding contact with the annular outer periphery of the clutch plate. These wipers in conjunction with associated pump slots provide for optimized scavaging and pumping of viscous fluid through the pump slots into a ring-like intermediate cavity between the forward face of the clutch plate and the rearward face of the pump plate. From this intermediate cavity, the fluid is quickly pumped by the pumping devices embossed on the rotating pump plate through a discharge port therein to the reservoir. The pumping slots and wipers whose leading edge or face can have any desired pumping angle to control and increase or decrease the rate of discharge from the shear zone or working cavity to the intermediate cavity and thus to the reservoir. In this invention the pumping slots, when used in conjunction with the wipers, will further increase the effectiveness and consistency of the viscous clutch. The number of pump slots and the angularity of the forward face of the wiper may be varied to increase or decrease the rate of discharge of fluid from the working chamber. The wiper material may be selected to suit operating requirements and may be low temperature plastic or high temperature Teflon depending on the operating environment. A primary advantage of this invention is to materially reduce operating horsepower and to reduce fan noise with faster disengagement.

These and other features, objects and advantages of this invention will become more apparent from the following detailed description and drawing in which.

Figure 1:
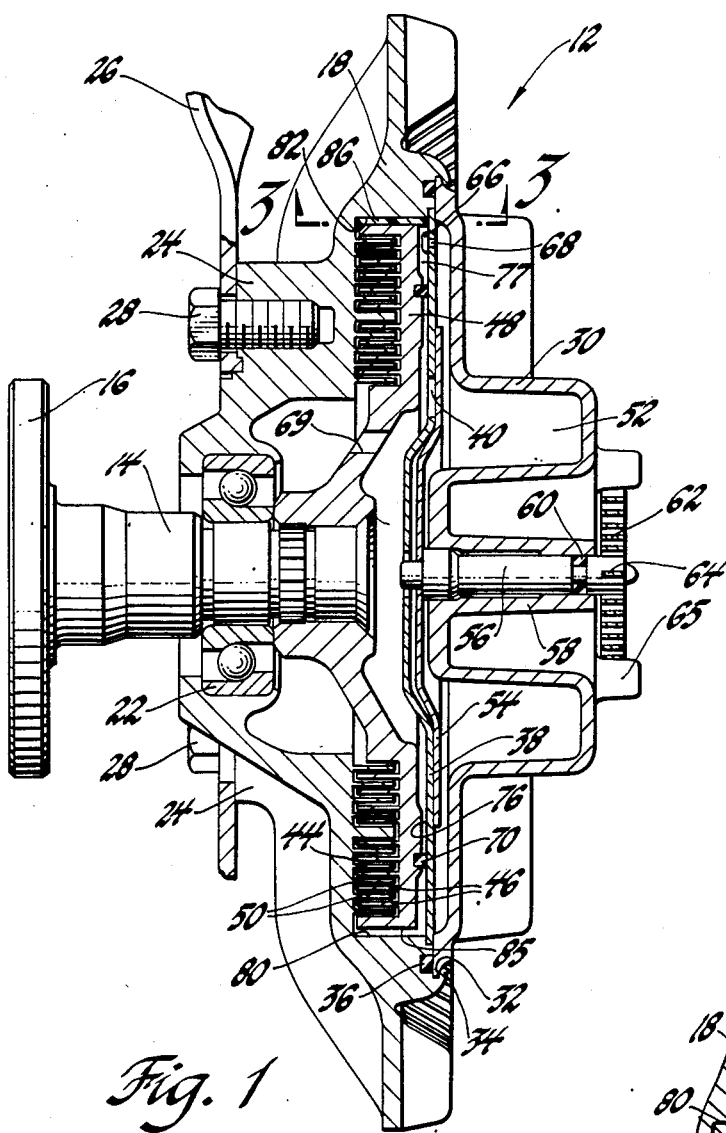
FIG. 1 is a cross-sectional view of a portion of a fluid shear-type clutch and fan assembly.

Turning now in greater detail to the drawing, there is shown in FIG. 1 a multi-bladed fan and clutch assembly 12 for drawing cooling air through the core of a vehicle radiator, not shown, through which engine cooling fluid is circulated. The fan and clutch assembly 12 is mounted on the outboard end of a rotatably driven shaft 14 whose inner end terminates in a flange 16 which can be secured to a conventional engine-driven water pump pulley, not shown. The fan and clutch assembly 12 comprises an annular dish-like main clutch body 18 centrally mounted for rotation on shaft 14 by bearing 22. The main body 18 is formed with a plurality of radially extending bosses 24 to which a multi-bladed fan 26 is attached by threaded fasteners 28. A cover plate 30 is mounted to the front of the main body 18 and cooperates therewith to form a housing for the viscous clutch and reservoir of this invention.

The cover plate 30 is a dished member whose annular outer edge 32 is secured to the main body by annular retainer lip 34 spun over from the material of the main body. Annular seal 36 interposed between the edge 32 and the forward face of the main body prevents fluid leakage of the silicone viscous clutching fluid from the interior of the clutch.

Disposed immediately behind cover plate 30 is a disk-like annular pump plate 38 whose diameter is slightly less than that of the cover plate 30. This pump plate is drivingly secured to the main body 18 since it is trapped on an annular shoulder on the main body by the cover plate 30.

The pump plate has an opening or gate 40 therein which, when opened, directs a flow of the silicone clutching fluid into an annular serpentined fluid shear zone 44 formed by the space between the interleaved concentric annular ridges 46 of a clutch plate 48 and corresponding concentric annular ridges 50 formed on the interior surface of the main body 18. The fluid sheared in this shear zone 44 transmits input torque from the rotatably driven clutch plate 48, centrally splined to shaft 14, to provide for the hydraulic drive of main body 18 and the bladed fan 26 attached thereto for cooling fan operation. Because of slippage in the drive, fan speed is less than input speed when the input is driving the fan. A reservoir 52 formed between the cover plate 30 and the pump plate 38 contains a specified quantity of silicone clutching fluid that circulates in a toroidal path when the gate 40 is open to varying degrees of opening as described. The opening and closing of the gate 40 to control of the supply of the clutch silicone fluid into the shear zone is through a valve plate 54 that extends from driving connection with a center shaft 56 which is rotatably mounted in a tubular hub portion 58 formed in the center of the cover plate 30. An O-ring seal 60 is mounted in an annular groove in the shaft 56 and makes peripheral contact with the inner wall of the hub to prevent fluid leakage to the exterior of the unit. A helically wound bimetallic thermostatic valve control element 62 is provided with an inner end portion 64 which is mounted in a transverse slot formed in the forward end of the center shaft 56. The outer end of the valve control element 62 is secured to a post 65 projecting from the cover. With this arrangement, an increase or decrease in ambient temperature causes the winding or unwinding of the metallic element resulting in rotation of the center shaft 56 and the valve plate 54 attached thereto.

A cylindrical projecting pump element 66 pressed in the pump plate 38 adjacent to the periphery thereof pumps fluid through a discharge orifice 68 formed in the pump plate back into the reservoir as is well known in this art. In the preferred embodiment, there is a fan clutch divider ring 70 operatively interposed between the pump plate and the clutch plate. This ring is a filled Teflon ring member which is operatively mounted in an annular groove formed in the outer face of the clutch plate. The ring 70 is of a square cross-section and the outer surface of this ring slidably engages the inner surface 76 of the pump plate 38 to form a ring-like intermediate fluid storage cavity 77 and to block the passage of fluid from the reservoir past the forward face of the pump plate into the pumping discharge port 68. Accordingly, the viscous clutching fluid is blocked from flow between the clutch plate and the pumping plate and is forced to move from gate 40 in the pump plate 38 through passages 69 in the clutch plate to the viscous shear zone 44. In the absence of the dynamic fluid seal and blocker ring 70, much of the viscous fluid leaving the reservoir through gate 40 would flow directly outwardly between the forward face of the clutch plate 48 and the adjacent face of the pump plate into the intermediate cavity 77 and to discharge port 68 thereby bypassing the fluid shear zone 44. This reduces efficiency and effectiveness of the viscous clutch. The annular divider ring by itself as pointed out in copending application Ser. No. 657,974 filed Oct. 5, 1984 entitled "Viscous Clutch For Engine Cooling Fan" and assigned to the assignee of this invention herein incorporated by reference improves pump-out performance or clutch disengagement time since the area between the pump plate and clutch plate is blocked and the possibility of oil recirculation downwardly in front of the clutch plate is eliminated when the gate is closed. The divider ring in effect forces viscous flow into the lands and grooves providing the drive surfaces of this clutch. With high speed differential, there is high efficiency and high volume pumping. The clutch blocker ring 70 further provides improved support outboard of the bearing providing a positive influence on durability. With this ring providing an outboard bearing, the clutch plate cannot frictionally contact the inside of the cover plate. This reduces heat buildup and wear and thereby extends service life.

Figure 3:
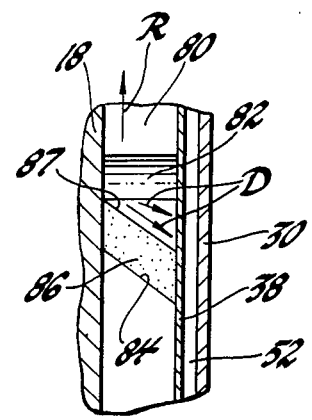
FIG. 3 is a sectional view taken along lines 3—3 of FIG. 1 to illustrate pumping action of the viscous fluid wiper employed in this invention.
Figure 2:
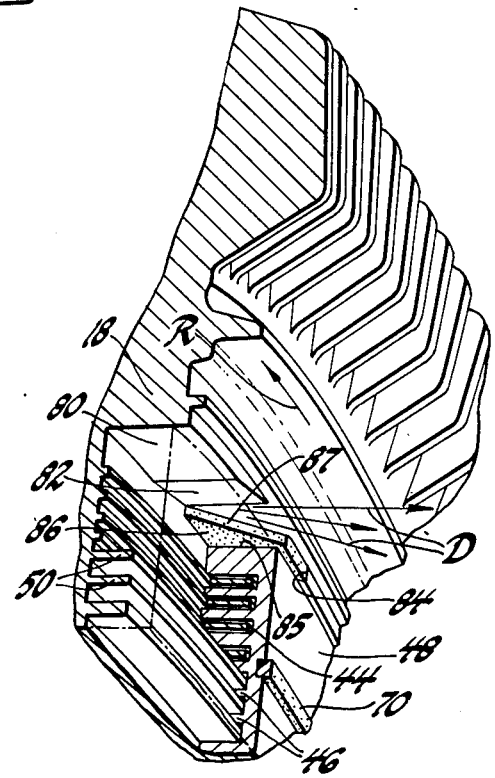
FIG. 2 is an enlarged isometric view of a portion of the fan clutch assembly of FIG. 1.

Importantly in this invention, the inner circumferential wall 80 of the main body 18 is formed with a plurality of wedge-shaped pumping slots or grooves 82 best shown in FIGS. 2 and 3. At the rear end of these slots, the wall 80 is formed with recesses 84 which carry flat rectilinear wipers 86 shown in FIGS. 2 and 3. These wipers are made from a suitable plastics which may vary from low temperature plastics to high temperature Teflon depending on the operating environment. These wipers slidably contact the annular periphery 85 of the clutch plate and have forward faces 87 that may be of any desired angle to optimize pumping from the shear zone to the intermediate cavity 77. The contact of the wipers at selected arcuate positions with the periphery of the clutch plate provides improved radial support and dynamic stability of this viscous clutch.

Figure 4:
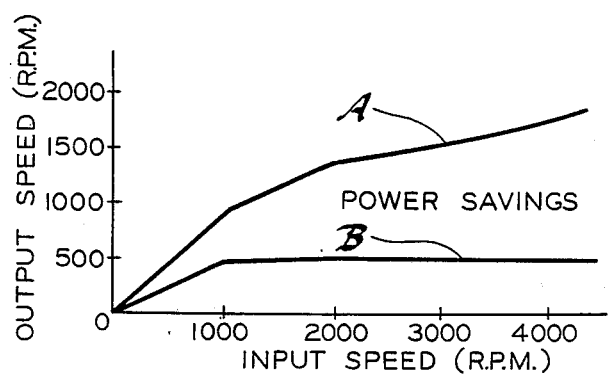
FIG. 4 is a graph illustrating power savings by the employment of this invention.

In the pump-out operation with the valve plate 54 moving to the closed position to block gate 40, the wipers rotating in a counterclockwise direction, arrow R, relative to the clutch plate slidably contact and scavage viscous fluid from the outer diameter of the clutch plate and vigorously pump the viscous fluid from the annular space between the main body wall 80 and the outer diameter of the clutch plate as illustrated by discharge arrows D. With this construction, the viscous fluid is quickly and actively pumped from the shear zone into annular intermediate chamber 77 outboard of blocker ring 70. From this chamber, the fluid is quickly pumped by the conventional pump element 66 into reservoir 52. The pumping grooves are also effective in the absence of the wipers since they are capable of pumping fluid with reduced effectiveness into the cavity 77. A standard clutch and a similar clutch with the new wipers and pump-out slots is shown in the curves of FIG. 4. Curve A represents operation of the standard clutch. As the input speed drops off toward zero, output or fan speed gradually diminishes to zero. With the standard clutch using the pump-out slots and wipers, curve B, output speed is flat and lower with comparative input speeds because of the efficiency of the pump-out slots and wipers. At 1000 rpm input, the valve plate 54 has completely closed the gate 40 and the output speed rapidly diminishes to zero as shown by curve B. The area between the two curves represents the savings in operating horsepower. Furthermore, since pump-out is faster, the effective viscous drive disengagment is faster which result is reduced fan noise.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A bladed fan and hydraulic clutch assembly for inducing a flow of cooling air through a radiator in which engine coolant is circulated comprising an input shaft member adapted to be rotatably driven, a generally cylindrical clutch plate means rotatably driven by said shaft member, clutch body means having a cavity bounded by a cylindrical inner wall for receiving said clutch plate means, said clutch body means being spaced from said clutch plate means to form a fluid shear zone therebetween for receiving a shearable clutch fluid so that said clutch body means can be rotatably driven by said clutch plate means through the shear of fluid in said shear zone, fan blade means extending radially from said clutch body means, a cover plate and a pump plate attached to said clutch body means to form a reservoir for a quantity of clutch fluid stored therein, said pump plate being a thin walled member having pumping means associated therewith to pump clutch fluid into said reservoir, said reservoir being separated from said clutch plate means by said pump plate, an opening through said pump plate for conducting hydraulic fluid from said reservoir to said fluid shear zone, an intermediate cavity between said clutch plate and said pump plate, valve means for opening and closing said opening to control the flow of fluid between said reservoir and said shear space, seal means disposed between said pump plate and said clutch plate means forming a hydraulically sealed inner limit of said intermediate cavity, control means for operating said valve means, and pump slots in the cylindrical inner wall of said clutch body means, and wiper means associated with said pump slots and slidably contacting the outside diameter of the clutch plate means and operatively cooperating with said pump slots to pump clutch fluid from the shear zone into said intermediate cavity so that said pumping means on said pump plate can pump fluid from said intermediate cavity into said reservoir to thereby optimize low speed disengagement of said clutch assembly and economize on power requirements for operating the fan.

2. A bladed fan and hydraulic clutch assembly for inducing a flow of cooling air through a radiator in which engine coolant is circulated comprising an input shaft member adapted to be rotatably driven, circular clutch plate means rotatably driven by said shaft member, clutch body means axially spaced from said clutch plate means to form a fluid shear zone therebetween for receiving a shearable clutch fluid so that said clutch body means can be rotatably driven by said clutch plate means through the shear of fluid in said shear zone, fan blade means extending radially from said clutch body means, a cover plate attached to said clutch body means to form a reservoir for a quantity of clutch fluid stored therein, a pump plate peripherally secured to said clutch body means radially, an annular divider ring operatively mounted between said clutch plate and said pump plate to form a hydraulic seal therebetween and thereby form an intermediate cavity hydraulically connected to said shear zone, said pump plate having pumping means associated therewith to rapidly pump fluid from said intermediate cavity to said reservoir, said reservoir being hydraulically separated from said clutch plate means by said pump plate, valve means to control the flow of fluid between said reservoir and said shear space, control means for operating said valve means and further including pump slots on the inside diameter of the clutch body means and wipers secured thereto at the end of said slots for sliding contact with the outside diameter of the clutch plate means to pump and increase the rate of fluid flow from the shear zone into said reservoir by way of said intermediate cavity and by the action of said pumping means to thereby increase low speed disengagement of said clutch assembly to thereby economize on power requirements for operating the fan.

3. A bladed fan and hydraulic clutch assembly for inducing a flow of cooling air through a radiator in which engine coolant is circulated comprising an input shaft member adapted to be rotatably driven, clutch plate means rotatably driven by said shaft member, clutch body means axially spaced from said clutch plate means to form a fluid shear zone therebetween for receiving a shearable clutch fluid so that said clutch body means can be rotatably driven by said clutch plate means extending radially from said clutch body means, a cover plate attached to said clutch body means to form a reservoir for a quantity of fluid stored therein, a pump plate fixed to said clutch body means for rotation therewith spaced forwardly of said clutch plate, a blocker ring supported by said clutch plate means and sealingly engaging said pump plate to form an annular intermediate fluid cavity, said pump plate having pumping means associated therewith radially outwardly of said blocker ring to pump fluid supplied from said shear space to said intermediate cavity into said reservoir, said reservoir being hydraulically separated from said clutch plate means by said pump plate, valve means to control the flow of fluid between said reservoir and said shear space, control means for operating said valve means and further including pump slots on the inside diameter of the clutch body means and flat wipers associated therewith for sliding contact with on the outside diameter of the clutch plate means to increase the rate of fluid flow from the shear zone into said intermediate cavity so that said pumping means can subsequently pump fluid to said reservoir to thereby increase low speed disengagement of said clutch assembly and thereby economize on power requirements for operating the fan.

* * * * *